United States Patent [19]
Nilson

[11] 3,910,467
[45] Oct. 7, 1975

[54] PRESSURE DISPENSING DEVICE WITH METERING TRAP CHAMBER

[76] Inventor: Billy Nilson, Finnstugatan 30, 595 00 Mjolby, Sweden

[22] Filed: Dec. 14, 1973

[21] Appl. No.: 424,914

[30] Foreign Application Priority Data
Dec. 15, 1972 Sweden............................ 16497/72

[52] U.S. Cl. ............................................... 222/449
[51] Int. Cl.² ........................................ G01F 11/08
[58] Field of Search ........... 222/494, 496, 493, 492, 222/453, 451, 450, 449, 444, 207

[56] References Cited
UNITED STATES PATENTS
3,734,350  5/1973  Waterman et al. ............ 222/494 X
3,794,213  2/1974  Schwartzman ................. 222/494 X Primary Examiner—Stanley H. Tollberg
Assistant Examiner—Norman L. Stack, Jr.
Attorney, Agent, or Firm—Ulle C. Linton

[57] ABSTRACT

A dispensing device for the contents of package in which a pressure can be exerted on said contents and the package has an outlet opening, which device has a stem normally closing an opening in a deformable diaphragm extending across said package opening and when pressure is exerted on said contents they push said diaphragm from said stem permitting the contents to flow through said diaphragm opening. Also a second diaphragm with an opening can be positioned across said package opening and spaced from said stem so that said contents when pressed causes said second diaphragm opening to be closed by said stem limiting the amount of contents between said two diaphragms to flow at a time through said first diaphragm opening.

4 Claims, 2 Drawing Figures

PRESSURE DISPENSING DEVICE WITH METERING TRAP CHAMBER

This invention relates to a dispensing device preferably for fluids.

On the market several simple and reliable devices for dispensing a certain number of tablets or a selected amount of a powdery substance are available but when it comes to dispensing of liquids and the like there has hitherto been no devices suitable for mass production.

Therefore, the main purpose of the invention is to provide such a device that is furthermore so simple that it may be manufactured to a price that only slightly exceeds the price of an ordinary closure for a bottle, a tube or the like.

To accomplish this and other purposes the new dispensing device is carried out according to the claims.

In the accompanying drawing an examplary embodiment of the invention is shown and the single figure illustrates a longitudinal section through part of a tube provided with the new dispensing device.

While the invention will be described in connection with a collapsible tube it will be understood that the invention is not limited hereto but may be applicated to all kinds of packages in which a pressure is exerted upon the contents of the package.

Figure 1:
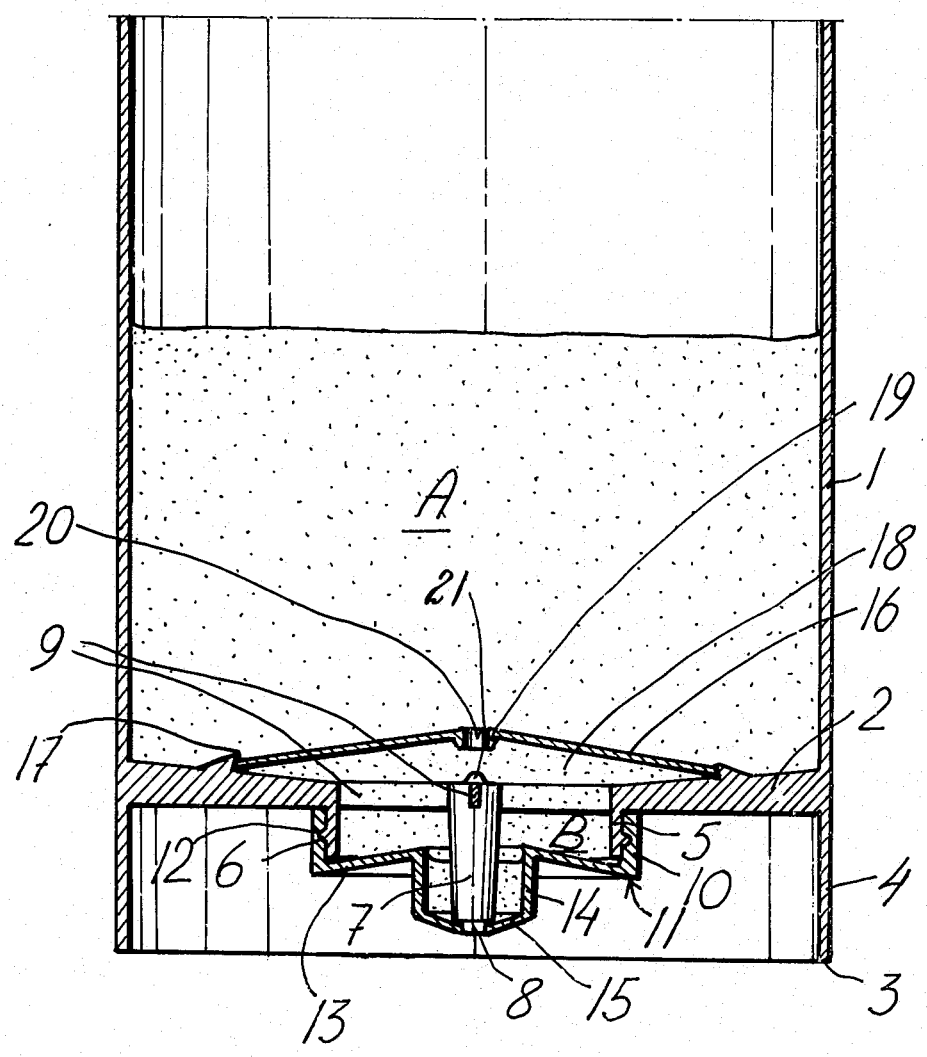
Figure 2:
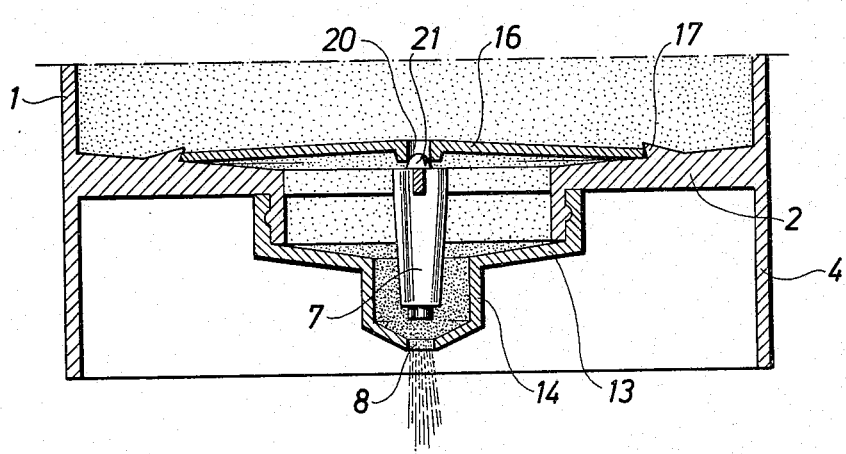

In the accompanying drawings,

FIG. 1 is a cross-sectional view of the bottom portion of a tube including the present dispensing means in its closed position, and, FIG. 2 is a view similar to FIG. 1, but with the dispensing means in its dispensing position.

In the illustrated embodiment reference numeral 1 designates the lower part of a tube having a closure at the top portion thereof. The tube is preferably made from an elastically yieldable material such as a plastic material. The illustrated tube has a bottom surface 2 located at a distance from the lower edge 3 of an extension 4 of the tube projecting from said bottom surface. The lower edge 3 has for its purpose to permit the upright positioning of the tube according to the drawing and it is to be understood that the extension 4 thus may be substituted by pins or the like downwardly directed from the bottom surface and they may be fully eliminated, respectively, when there is no need to position the tube in an upright position.

A collar portion 5 extends downwardly from the bottom surface 2 and has a threading, a bead 6 or a similar attachment part. The neck portion defines the dispensing opening of the tube and centrally positioned therein is a stem 7. The lower end of said stem has a reduced diameter 8. The stem is preferably integral with the neck portion and consequently also with the whole tube by means of a number of substantially radially extending ribs 9. Of course, these ribs 9 may be replaced by a disc shaped perforated part. The neck portion 5 serves to grip an outer sleeve shaped part 10 of a closure part generally designated by reference numeral 11 and for this purpose the sleeve shaped part 10 has a threading, a groove 12 or the like to co-operate with the corresponding attachment part 6 of the tube neck. The sleeve shaped part 10 merges into and is integral with a diaphram 13, which in the inner part thereof merges into a downwardly directed sleeve 14 preferably terminating in a funnel shaped end portion 15. This funnel shaped end portion has an opening dimension which very closely corresponds to the dimension of the lower part 8 of the stem 7 and the end portion thus defines a valve seat for the stem which serves as a valve body. By making the stem and the ribs thereof, respectively, substantially rigid while the closure part is deformable by means of the diaphragm thereof, it may be understood that a pressure exerted upon the contents of the tube will downwardly displace the sleeve 14 of the closure part and thereby expose the dispensing opening thereof, such that dispensing of the contents of the tube occurs.

In order to limit the dispensed amount by this dispensing operation to a pre-selected volume a diaphragm 16 is inserted between the tube and the closure part. For this purpose undercut at least one circumferential groove 17 is provided in the bottom of the tube 2. Said groove secures the outer edge portion of the diaphragm 16 to the bottom. By designing the diaphragm convex according to the drawing the insertion into the actual groove by pressure is facilitated at the same time as a space 18 of a pre-selected volume is formed by the concavity of the bottom. The diaphragm has in the center part thereof a preferably thickened portion 19 provided with a thin hole 20. An upwardly directed projection 21 extends from the stem towards said diaphragm and said projection is of such a dimension and shape respectively, that it may close the hole 20 when the center of the diaphragm is pressed downwardly.

Thus, when a pressure is exerted upon the contents of the tube, such as by exerting a pressure upon the actual tube, as disclosed above, a certain amount of the contents of the tube will be dispensed through the funnel shaped end portion 15. However, by this dispensing operation, also the center part of the diaphragm 16 is displaced towards the bottom surface 2 and proportionally faster the smaller the opening 20 employed. When the center part of the diaphragm in this manner engages the projection 21 a sealing action between the opening 20 of the diaphragm and said projection will occur, making further dispensing of material from the tube impossible. By a suitable choice of the strength and opening 20 of the diaphragm in relation to the dispensing part and the contained fluid respectively, it is thus possible to decide which amount of fluid that in every occasion will be dispensed. Tests previously made have shown that a very good accuracy is obtainable.

Naturally, the invention may be varied in several ways, for example, in the bottom of the tube several mutually concentric grooves 17 may be provided so that according to the desired dispensed amount and viscosity of the fluid, respectively, a greater or smaller diaphragm may be inserted.

I claim:

1. A fluid dispensing package comprising a first chamber and a second chamber, a diaphragm separating said second chamber from said first chamber, said diaphragm having a narrow opening, a valve element positioned in said second chamber for engaging and closing said diaphragm opening, said diaphragm having in its untensioned condition its opening out of contact with said valve element, said second chamber having an opening, a second diaphragm closing said second chamber opening, said second diaphgram having an opening, a second valve element provided in said second chamber and normally closing said second diaphgram opening, the arrangement of said diaphgrams being such that a pressure exerted upon a fluid substance contained in said first chamber causes such substance to pass from said first chamber via the opening of said first diaphgram into said second chamber at the same time deforming said diaphgram of first chamber, thereby successively approaching the opening of said diaphgram to said first valve element and finally engaging the same to close said opening, the diaphgram of said second chamber being in its normal condition resiliently pressed against said second valve element and provided to open in response to the pressure to the substance contained in said second chamber and to close when said pressure ceases.

2. A dispensing package as claimed in claim 1, wherein said first chamber consists of a flexible container, and said second chamber at least partially consists of the interior of an attachment part connected to said container.

3. A dispensing package as claimed in claim 1, wherein a container includes said first chamber which has a bottom surface onto which the periphery portion of said first diaphgram is secured and which bottom surface has a central opening communicating with the interior of said second chamber, an axially extending stem fixedly supported by said bottom surface and the ends thereof has projections providing said valve elements sealingly cooperate with the openings of said diaphgrams.

4. A dispensing package as claimed in claim 3, wherein the bottom surface of said first chamber is concave and has a least one coaxial circumferential recess serving to hold the periphery of said first diaphgram.

* * * * *